United States Patent [19]

Bachmann et al.

[11] Patent Number: 5,385,958
[45] Date of Patent: Jan. 31, 1995

[54] ACTIVATOR FORMULATION AND COMPOSITION UTILIZING SAME

[75] Inventors: Andrew G. Bachmann, Harwinton; Stephen E. Cantor, Cheshire, both of Conn.

[73] Assignee: Dymax Corporation, Torrington, Conn.

[21] Appl. No.: 26,814

[22] Filed: Mar. 5, 1993

[51] Int. Cl.$^6$ ............................ C08F 2/50; C08F 4/34; C09J 4/02

[52] U.S. Cl. ..................................... 522/170; 522/13; 522/181; 526/208; 526/328; 526/109; 528/250; 528/393

[58] Field of Search .................... 522/13, 24, 182, 170, 522/181; 526/109, 208, 328; 528/250, 393

[56] References Cited

U.S. PATENT DOCUMENTS

| | | | |
|---|---|---|---|
| 4,223,115 | 9/1980 | Zalucha et al. | 525/455 |
| 4,348,503 | 9/1982 | Bachmann | 525/455 |
| 4,425,179 | 1/1984 | Bauer et al. | 526/328 |
| 4,429,088 | 1/1984 | Bachmann | 526/135 |
| 4,432,829 | 2/1984 | Bachmann | 156/307.3 |
| 4,840,978 | 6/1989 | Koleske et al. | 522/170 |
| 4,885,319 | 12/1989 | Dougherty et al. | 522/31 |
| 4,963,220 | 10/1990 | Bachmann et al. | 156/307 |
| 4,964,938 | 10/1990 | Bachmann et al. | 156/273.7 |
| 5,003,016 | 3/1991 | Boeder | 526/208 |
| 5,039,715 | 8/1991 | Bachmann et al. | 522/13 |
| 5,106,885 | 4/1992 | Liu et al. | 522/170 |
| 5,106,928 | 4/1992 | Skoultchi et al. | 526/328 |
| 5,264,525 | 11/1993 | Lees | 525/154 |
| 5,328,947 | 7/1994 | Taguchi et al. | 526/328 |

OTHER PUBLICATIONS

Crivello et al., "Photoinitiated Cationic Polymerization With Multifunctional Vinyl Ether Monomers", *Journal Radiation Curing*, Jan. 1983–1987.

Lapin et al, "Vinyl Ether Terminated Ester Monomers; New Reactive Diluents For Cationic Curing" Allied-Signal Research and Technology; Radtech '90 North American Conf. Proc. vol. 1, pp. 410–414, 1990.

R. J. Brautigam et al, "New Vinyl Ether Oligomers and Diluent Monomers for Cationic Curing", Allied-Signal Research and Technology, pp. 99–104.

*Primary Examiner*—Susan W. Berman
*Attorney, Agent, or Firm*—Ira S. Dorman

[57] ABSTRACT

A multi-part composition is provided which is suitable for use as an adhesive, a potting compound, a coating or a sealant. It consists of a polymerizable acrylate formulation and an activating formulation, the latter usually comprising an amine-aldehyde condensation product diluted with a liquid vinyl ether; liquid epoxies may also be included as diluents in the activating formulation.

17 Claims, No Drawings

ACTIVATOR FORMULATION AND COMPOSITION UTILIZING SAME

BACKGROUND OF THE INVENTION

Amine-aldehyde condensation products are widely employed as chemical activators for effecting free radical-initiated polymerization, notably in compositions such as the acrylate adhesives that are disclosed in Bachmann U.S. Pat. Nos. 4,348,503, 4,429,088, and 4,432,829, and Bachmann et al U.S. Pat. Nos. 4,963,220, 4,964,938, and 5,039,715. Such activators are commercially available from several sources, and are typically used as solutions in 1,1,1-trichloroethylene or alcohol; illustrative products include VANAX 808 (aniline/-butyraldehyde) and VANAX 833 (butylamine/-butyraldehyde), both sold by R. T. Vanderbilt, Inc., and HEPTEEN BASE (aniline/heptaldehyde), sold by Uniroyal Chemical Corporation.

The inclusion of an inert solvent in an otherwise solvent-free system is of course disadvantageous from a number of standpoints. Such solvents may give rise to flammability, toxicity, and ozone-depletion problems; bond strengths may be reduced due to solvent residues and/or excessive plasticization; shrinkage upon curing may be increased; and evaporation requirements will diminish the convenience, and indeed feasibility, of use for many applications. Needless to say, such disadvantages are encountered irrespective of the particular activator and polymerization formulations involved.

SUMMARY OF THE INVENTION

Accordingly, it is a broad object of the present invention to provide a multi-part, solvent-free composition that cures, by free radical-inducing chemical activation, to an adhesive solid, and to provide an activating formulation that is suitable for use therein.

A more specific object is to provide such a composition and formulation in which the initiating ingredient is admixed with a diluent that is itself copolymerizable with the ingredient(s) of the polymerizable formulation.

A further object is to provide such a composition and formulation in which the diluent is a mixture of ingredients that function effectively while also affording improved economics.

Other broad objects of the invention are to provide methods, for bonding, coating, potting and sealing, in which methods problems and disadvantages stemming from the presence of inert solvents are ameliorated, or entirely avoided.

It has now been found that certain of the foregoing and related objects of the invention are attained by the provision of a multi-part, solvent-free composition that cures by chemical activation to an adhesive solid, which composition comprises a polymerizable formulation and an activating formulation. A two-part composition will usually be provided, and will often be particularly convenient for use when the formulations are so prepared as to react with one another in about a 1:1 ratio. The polymerizable formulation includes at least one polymerizable liquid acrylate ingredient, and is preferably comprised of a polymerizable acrylate monomer and an elastomeric domain-providing filler; it may advantageously also include about 0.5 to 5 weight percent of an organic acid that is capable of cyclic tautomerism, typically maleic acid. The activating formulation contains about 0.5 to 80, and usually not more than 70, weight percent of a free radical-initiating ingredient, and conversely about 20 to 99.5, and usually at least 30, percent of a reactive diluent; 20 to 100, and preferably at least 40 weight percent of the diluent is a liquid vinyl ether compound, the remainder being a liquid epoxy compound. The composition includes an active oxygen compound that is reactive with the initiating ingredient to generate free radicals, normally supplied as an ingredient of the polymerizable formulation. Photoinitiators and transition metal accelerators may additionally be included, each to substantial benefit.

The vinyl ether diluents used will usually conform to the structural formula:

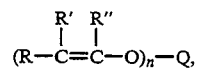

in which formula each of the substituents R, R' and R" independently represents an hydrogen atom, an aliphatic group, or an aromatic group; n is an integer, usually having a value from 1 to 6; and Q represents an aliphatic group, an aromatic group, an alkoxy group, a cycloaliphatic group, an ester group, a polyester group, an ether group, a polyether group, a carbamide group, a carbamate group, an heterocyclic group, or the like, each of such groups optionally being further substituted by an hydroxyl or a vinyl group, or both. The vinyl ether-terminated ester monomers and vinyl ether-terminated aromatic urethane oligomers, described in the following papers, may also find utility as the vinyl ether ingredient of the activating formulation: "New Vinyl Ether Oligomers And Diluent Monomers For Cationic Curing (Brautigam et al; Proceedings of RadTech '90—North America, Radiation and Curing Conference and Exposition, Vol. 1, pages 99–104); and "Vinyl Ether Terminated Ester Monomers: New Reactive Diluents For Cationic Curing" (Lapin et al; Proceedings of RadTech '90—North America, Radiation and Curing Conference and Exposition, Vol. 1, pages 410–414). It is also believed that analogous compounds, in which a sulfur atom replaces the oxygen of the ether group(s), may be used (alone or in combination) as the diluent ingredient of the activating formulation hereof.

Other objects of the invention are attained by the provision of an activating formulation comprised of the ingredients set forth, and still others are attained by the provision of a method that employs the multi-part composition described. In accordance with one embodiment of the method, two (or more) separate formulations are applied to at least one surface, and are mixed together by bringing another surface into substantial contact therewith. The method may also be utilized for coating, for cavity filling (as in potting), and for sealing, in which embodiments the formulations will be mixed with one another before application (as may of course also be done when they are used as adhesives, assuming the pot-life is sufficient).

DETAILED DESCRIPTION OF THE PREFERRED EMBODIMENTS

Exemplary of the efficacy of the present invention are the following specific Examples, in which all parts and percentages set forth are on a weight basis, and all reactions are carried out at room temperature, unless specified otherwise:

EXAMPLE ONE

An adhesive formulation was prepared by admixing the following ingredients, in the amounts (parts) indicated in parentheses: polyurethane-acrylate oligomer (20), 2-hydroxyethyl methacrylate [HEMA] (31.5), isobornyl acrylate [IBOA] (25), polystyrene impact-modifier resin (10), acrylic acid (5), maleic acid (1.5), amorphous fumed silica (5), and t-butyl perbenzoate (2).

Steel laps, each measuring about 2.5×10×0.16 cm, were freshly sanded using 100 grit paper. A thin (0.03 to 0.13 mm) layer of the foregoing adhesive formulation was applied to a surface of one of the laps, and a layer of each of the activator/diluent formulations described in TABLE ONE, which follows, was applied as a thin film to another lap. The coated areas of the two pieces were brought together, with an overlap of about 1.25 cm, and the assembly was secured by a clamp; room temperature curing was allowed to occur for 24 hours.

Five specimens of each combination were so prepared, and were tested for shear tensile strength using a Tinius Olsen testing machine (model SG Locap) operating at about 15.24 cm (0.5 foot) per minute; averaged values are reported in the TABLE:

TABLE ONE

| Diluent | Activator (%) | Tensile Shear |
| --- | --- | --- |
| UVR-6128/DVE-3 | VANAX 808 (33) | 168 (2396) |
| UVR-6351/DVE-3 | VANAX 808 (33) | 148 (2100) |
| UVR-6110/DVE-3 | VANAX 808 (20) | 180 (2556) |
| DVE-3 | VANAX 808 (70) | 158 (2254) |
| PEPC | VANAX 808 (50) | 145 (2056) |
| CHVE | VANAX 808 (70) | 176 (2508) |
| DVE-3/ARALDITE | VANAX 808 (22) | 197 (2808) |
| DVE-3 | VANAX 808 (50) | 199 (2830) |
| DVE-3 | VANAX 808 (20) | 197 (2808) |
| DVE-3 | VANAX 808 (33) | 209 (2980) |
| THFVE | VANAX 808 (20) | 183 (2610) |
| DDVE | VANAX 808 (20) | 176 (2508) |
| DVE-3 | VANAX 808 (1) | failed |
| DVE-3 | VANAX 808 (10) | 214 (3038) |
| DVE-3/UVR-6110 | VANAX 808 (5) | 223 (3170) |
| DDVE | HEPTEEN BASE (2) | 181 (2572) |
| DVE-3 | HEPTEEN BASE (50) | 182 (2582) |
| DVE-3 | HEPTEEN BASE (30) | 179 (2546) |
| DVE-3 | HEPTEEN BASE (50) | 182 (2582) |
| CVE | HEPTEEN BASE (20) | 176 (2504) |
| CVE/UVR-6110 | HEPTEEN BASE (20) | 195 (2776) |
| HBVE | HEPTEEN BASE (20) | 175 (2492) |
| HBVE/ARALDITE | VANAX 833 (20) | 63 (896) |
| CVE | VANAX 833 (20) | 69 (984) |
| DVE-3 | VANAX 833 (20) | 53 (752) |
| DVE-3/ESO Oil | VANAX 833 (20) | 73 (1036) |
| Trichloroethylene | VANAX 808 (16) | 158 (2254) |
| None | VANAX 808 (100) | 74 (1048) |

The abbreviations used in TABLE ONE stand for the following compounds: triethylene glycol divinyl ether (DVE-3), 1,4-cyclohexane dimethanol divinyl ether (CHVE), propenyl ether of propylene carbonate (PEPC), n-dodecyl vinyl ether (DDVE), hydroxybutyl vinyl ether (HBVE), cyclohexyl vinyl ether (CVE), and tetrahydrofuran vinyl ether (THFVE). The products designated UVR-6110, UVR-6128, and UVR-6351 are, respectively, 3,4-epoxycyclohexylmethyl-3,4-epoxy-cyclohexanecarboxylate, bis-(3,4-epoxycyclohexyl)adipate, and a mixture of liquid epoxides, all sold by Union Carbide Corporation; ARALDITE is the product ARALDITE GY 6010, and is the diglycidyl ether of bisphenol A, sold by Ciba-Geigy Corporation; ESO Oil is an epoxidized soybean oil sold by C. P. Hall Company under the designation PARAPLEX G 60; and the VANAX and HEPTEEN BASE aldehyde-amine activators are as hereinabove identified. In those instances in which the diluent is shown to comprise two ingredients, they are present in equal amounts (1:1 ratio). The relative proportions of the diluents and the activators are indicated by the number shown in parentheses following the activator designation, which represents its percentage concentration (the remainder being the diluent). Tensile shear values are taken at room temperature, and are expressed in kilograms per square centimeter (as well as in pounds per square inch, in parentheses).

As will be noted from a comparison of the control test that employs an activator solution prepared from trichloroethylene and 15% VANAX 808, with the test that follows it in the TABLE (i.e., comparing the last two tests), the use of neat VANAX produces an inferior result. In general, moreover, it is seen that the vinyl ether and vinyl ether/epoxy diluent-containing systems provide values that are better than that which is exhibited by the halogenated solvent control formulation. The specimen that was bonded using an activating formulation containing only 1% of VANAX 808 did not produce measurable strengths.

EXAMPLE TWO

A polymerizable formulation was prepared by admixing the following ingredients, in the amounts (parts) indicated in parentheses: polyurethane-acrylate oligomer (40), HEMA (35), acrylic acid (4), maleic acid (1.5), amorphous fumed silica (6), polystyrene impact modifier resin (9), t-butyl perbenzoate (2), and a UV-responsive photoinitiator (1.4), specifically, dimethoxy-2-phenylacetophenone (Ciba-Geigy IRGACURE 651). A measured quantity of the foregoing formulation was thoroughly mixed in a vessel with an equal quantity of an amine-aldehyde activating formulation, the latter containing 22 parts of VANAX 808, 39 parts of DVE-3, and 39 parts of ARALDITE GY 6010. An exotherm was noted after about 50 seconds, attaining a maximum temperature of 75° C., and a hard, tough, intractable, solid mass soon formed. The mass conformed to the shape of the vessel, and was found to have a Shore D hardness value of 20 and a shrinkage value of 2.77 percent, the overall properties of the mass thus indicating the suitability of the composition for use as a potting compound and for filling voids.

EXAMPLE THREE

Part A

VANAX 808 was added, in an amount sufficient to provide a concentration of about 1.6 percent, to a premixture of equal parts of DVE-3 and the adhesive formulation of EXAMPLE ONE. An exotherm was noted, and a dark, solid reaction mass was produced. The mass was subdivided after being maintained for about 24 hours at room temperature, and 8.0 parts thereof was placed into the thimble of a Soxhlet extractor. Methanol was caused to reflux through the material for a total period of 18 hours, after which the residuum was carefully removed and dried; the yield was 6.85 parts (i.e., 85.63 percent of the mass was insoluble).

Part B

A comparison test was run by repeating the foregoing reaction, curing, and extraction procedures, using however the adhesive formulation alone (i.e., excluding the vinyl ether compound); 6.4 parts (80 percent) of residuum remained after extraction. Taking into account inherent variables, it can be concluded from these tests that the products produced in Parts A and B hereof achieved substantially the same degree of polymerization, following chemical activation.

EXAMPLE FOUR

Part A

An anaerobic thread-locking product that is sold by Loctite Corporation under the name 290 Adhesive/Sealant, and is believed to contain 90 to 95 parts of polyglycol dimethacrylate, 3 to 5 parts of cumene hydroperoxide, 1 to 3 parts of saccharin, and 0.1 to 1 part of an N,N-dialkyltoluidine, was admixed with an equal amount of the activating formulation hereinabove described in EXAMPLE TWO. Gelation occurred in about 30 seconds, accompanied by an exotherm having a maximum temperature of about 70° C.

Part B

The foregoing procedure was repeated, substituting however for the "290" product a second-generation acrylic product sold by Lord Corporation under the designation VERSALOCK 830; comparable results were achieved. The VERSALOCK product is believed to contain the following ingredients, in the parts indicated: 60 to 70 methylmethacrylate, 20 to 30 chlorosulfonated rubber, 10 to 15 ethyleneglycol dimethacrylate, 10 to 15 methacrylic acid, and 2 to 3 cumene hydroperoxide.

Part C

An anaerobic structural adhesive product that is sold by Loctite Corporation under the name Speedbonder 319, and is believed to contain 45 to 50 parts of a polyurethane methacrylate resin, 30 to 35 parts of an hydroxyalkyl methacrylate, 10 to 15 parts of a polymeric plasticizer, 3 to 5 parts of acrylic acid, 1 to 3 parts of cumene hydroperoxide, 1 to 3 parts of a substituted silane compound, 0.1 to 1 part of 1-acetyl-2-phenylhydrazine, and 0.1 to 1 part of saccharin, was admixed with an equal amount of the activating formulation used in Parts A and B hereof. Gelling was observed to occur in about 3 to 5 minutes, and was accompanied by an exotherm that attained a maximum temperature of 35° C.

EXAMPLE FIVE

A number of glass slides were prepared by applying to them a thin film of the adhesive formulation employed in EXAMPLE ONE. Others were prepared by applying a thin film of one of the following two activating formulations: (A) 16 parts of VANAX 808 in 84 parts of isopropyl alcohol; (B) 22 parts of VANAX 808 in a mixture of 39 parts of DVE-3 and 39 parts of ARALDITE GY 6010. The slides coated with the activating formulations were aged under ambient conditions, and each was then assembled face-to-face with one of the adhesive-carrying slides. Fixture times (i.e., times to achieve immobilization of the assembled slides, under manual force) were noted, and tensile shear strengths after curing were measured; the data obtained are set forth in TABLE TWO below, in which the periods of aging are indicated at the heads of the columns, fixture times are expressed in minutes, and tensile strengths are expressed in kg/cm$^2$:

TABLE TWO

|  | One Hour | | Four Days | |
| --- | --- | --- | --- | --- |
|  | A | B | A | B |
| Fixture: | 0.5 | 0.5 | 45 | 4 |
| Strength: | 166 | 189 | 89 | 178 |

From these data it is seen that activating formulations embodying the invention remain much more effective, following extended aging periods, than do the conventional activator solutions tested.

EXAMPLE SIX

Part A

Tensile strength tests were carried out as described in EXAMPLE ONE, using the "319" adhesive product of EXAMPLE FOUR, Part C, in combination with the activating formulation of EXAMPLE TWO; a value of about 58 kg/cm$^2$ was achieved. Substituting an activating formulation containing 70 parts DVE-3 and 30 parts VANAX 808 produced a strength value of about 63 kg/cm$^2$. The fixture time using glass slides (in the manner described in EXAMPLE FIVE, but without aging) was about six hours in each case.

Part B

The same tests were carried out using an anaerobic structural adhesive formulation sold by Loctite Corporation under the name Speedbonder 324 and believed to contain: 50 to 55 parts polyurethane acrylate resin, 25 to 30 parts hydroxyalkyl methacrylate, 15 to 20 parts high-boiling methacrylate, 3 to 5 parts t-butyl perbenzoate, 1 to 3 parts acrylic acid, and 1 to 3 parts saccharin; the tensile strength values corresponding to those of Part A were 74 and 80 kg/cm$^2$, respectively, and the fixture time was about 20 minutes.

Part C

The foregoing tests were repeated using another Loctite anaerobic structural adhesive called Speedbonder 326, believed to contain: 45 to 50 parts polyurethane methacrylate resin, 30 to 35 parts hydroxyalkyl methacrylate, 10 to 15 parts high-boiling methacrylate, 1 to 3 parts acrylic acid, 0.1 to 1 part 1-acetyl-2-phenylhydrazine, 0.1 to 1 part cumene hydroperoxide, and 0.1 to 1 part saccharin; corresponding tensile values were 35 and 70 k/g cm$^2$, respectively, and the fixture time about was 6 hours.

Part D

Loctite Speedbonder 392 was used in the same tests, and is believed to contain: 35 to 40 parts polyurethane methacrylate resin, 20 to 25 parts high-boiling acrylate, 20 to 25 parts hydroxy-alkyl methacrylate, 5 to 7 parts methacrylic acid, 5 to 7 parts modified silicon dioxide, 3 to 5 parts t-butyl perbenzoate, 1 to 3 parts maleic acid, and 1 to 3 parts saccharin; corresponding tensile strength values measured were 172 and 155 respectively, and the fixture time was about 30 seconds.

EXAMPLE SEVEN

Part A

The addition of 7 parts of amorphous fumed silica (AEROSIL R-202, sold by Degussa Corporation) to 93 parts of a 70 percent solution of VANAX 808 in DVE-3 produced an activator gel. The product was introduced into the chamber of a 30 ml plastic syringe, and was dispensed manually to form a bead on the surface of a steel lap. A second lap, carrying a layer of the polymerizable formulation described hereinabove in EXAMPLE TWO, was assembled with the first, with a 1.25 cm overlap, and the parts were clamped together and allowed to cure at room temperature for 24 hours. Lap-shear tensile values were taken as described above, with five such assemblies, and gave an averaged value of 161 kg/cm$^2$.

Part B

In similar fashion, a bead of the same activator gel was formed on the surface of metal motor housing, and the same polymerizable formulation was applied, as a second bead, alongside the first. The deposits were mixed by placing a metal flange against the housing and rotating it through one full circle; excess material extruded from between the surfaces to form a fillet. The assembly was subjected to 365 nanometer UV radiation, thereby effecting cure of the fillet. After 24 hours at room temperature, the assembly was tested in a laboratory press and was found to withstand a shear force in excess of 2,720 kilograms before rupture of the bond occurred.

EXAMPLE EIGHT

Mixtures of amine-aldehyde activators with either a reactive diluent or a polymerizable monomer were aged at 53° C. to assess stability; the results are set forth below in TABLE THREE, in which the following abbreviations, not previously defined, apply: n-vinyl-2-pyrrolidone (NVP), trimethylolpropane trimethacrylate (TMPTMA), and tetrahydrofurfural acrylate (THFA). In all instances the activator is present in a 20 percent concentration, and times are expressed in hours unless indicated otherwise. (The 168-hour periods represent tests that were terminated after one week's time).

TABLE THREE

| Formulation | Time | State |
|---|---|---|
| DVE-3/VANAX 808 | 168 | liquid |
| PEPC/VANAX 833 | 168 | liquid |
| HBVE/HEPTEEN BASE | 168 | liquid |
| NVP/VANAX 808 | 48 | some gel |
| TMPTMA/VANAX 808 | 30 | gelled |
| THFA/VANAX 808 | 30 | gelled |
| IBOA/VANAX 808 | 48 | viscous |
| DVE-3/UVR-6110/VANAX 833 | 168 | liquid |
| DVE-3/VANAX 808 | 3 months | liquid |
| DVE-3/VANAX 808 + t-butyl perbenzoate (1%) | 3 months | liquid |
| HEMA/VANAX 808 | 24 | polymerized |
| HEMA/VANAX 808 + t-butyl perbenzoate (1%) | 10 minutes | exothermic polymerization |

As will be appreciated from the foregoing, activator formulations that include monomers that are typically incorporated in useful adhesive formulations (i.e., acrylate, methacrylate, and vinyl amide monomers) are unstable in admixture with the amine-aldehyde condensation products, as indicated by gelation, increased viscosity, and of course polymerization.

EXAMPLE NINE

The adhesive formulation of EXAMPLE ONE was used in combination with various activator formulations, and in varying ratios, in the lap shear test described therein. The activator formulation consisted of the vinyl ether DVE-3, admixed with zero to 90 percent (based upon the combination of diluents) of the epoxide ARALDITE GY 6010, and 5 to 50 percent (based upon the total weight of the formulation) of VANAX 808. In TABLE FOUR, which follows, the relative proportions of vinyl ether and epoxide are indicated by setting forth under the heading "DVE-3" the percentage of the diluent that is constituted by vinyl ether; the relative proportions of amine-aldehyde and diluent are indicated by setting forth as column headings the percentage of VANAX used:

TABLE FOUR

| VANAX 808: DVE-3 | 50 | 30 | 15 | 5 |
|---|---|---|---|---|
| | Tensile Shear Strength | | | |
| 100 | 157 | 174 | 159 | 130 |
| 90 | 183 | 168 | 154 | 137 |
| 80 | 152 | 182 | 172 | 134 |
| 70 | 159 | 168 | 173 | 136 |
| 60 | 133 | 182 | 178 | 174 |
| 50 | 159 | 181 | 176 | 181 |
| 40 | 142 | 157 | 184 | 172 |
| 30 | 131 | 161 | 159 | 135 |
| 20 | 127 | 172 | 147 | 101 |
| 10 | 139 | 169 | 60 | 50 |

By virtue of the tensile strengths exhibited (which are expressed in kg/cm$^2$), the foregoing data demonstrate that, in the compositions described, both the vinyl ether and the epoxide compounds undergo copolymerization with the ingredients of the polymerizable formulation.

EXAMPLE TEN

Equal parts mixtures of DVE-3 and ARALDITE 6010 were made, containing varying amounts of VANAX 808. The resultant activating formulations were mixed in a 50 ml plastic beaker with the polymerizable formulation of EXAMPLE TWO, in a ratio of polymerizable formulation to activating formulation of either 1:1 or 9:1, and the pot-life (i.e., time to set-up) and exotherm temperature of each admixture were measured. The data are set forth in TABLE FIVE below:

TABLE FIVE

| Ratio | % VANAX | Pot Life | Temperature °C. |
|---|---|---|---|
| 1:1 | 20 | 10 sec. | 29 |
| 1:1 | 10 | 15 sec. | 29 |
| 1:1 | 2 | 40 sec. | 34 |
| 1:1 | 1 | 80 sec. | 34 |
| 1:1 | 0.5 | 10 min. | 26 |
| 1:9 | 20 | 10 sec. | 60 |
| 1:9 | 10 | 25 sec. | 80 |
| 1:9 | 2 | 1 min. | 75 |
| 1:9 | 1 | 3.5 min. | 75 |
| 1:9 | 0.5 | 15 min. | 65 |

EXAMPLE ELEVEN

Part A

An activating formulation was prepared from 60 parts DVE-3, 40 parts ARALDITE 6010, 4 parts N,N-dimethyl toluidine, and 0.1 part copper acetylacetonate. Mixed with each of the Speedbonder 319 and 326 products, in an adhesive:activating formulation ratio of 5:1, gels were formed in about 1.5 minutes; application of the formulations to steel laps produced a shear strength of about 35 kg/cm$^2$ in the case of the "319" product, and about 70 kg/cm in the case of the "326" adhesive. Somewhat less beneficial results were obtained when the diluent consisted solely of the vinyl ether compound.

Part B

An activating formulation of 0.4 percent ferrocene in DVE-3 effected gelling of the polymerizable formulation of EXAMPLE TWO in about 1.5 minutes.

Part C

An activating formulation containing 97 parts DVE-3, 2.2 parts of copper octoate, and 0.8 part tributylamine effected gelling of the Speedbonder 326 adhesive in about 1.5 minutes. Used in steel lap-shear tests, the same components produced a tensile strength of about 112 kg/cm$^2$.

EXAMPLE TWELVE

Steel laps were coated with a layer of either the polymerizable formulation of EXAMPLE ONE or of EXAMPLE TWO, and were bonded to other laps, coated with a layer of activating formulation, by contacting and curing them for one hour at room temperature, followed by curing for an additional hour at 80° C. Set forth in TABLE SIX below are the ingredients of the activating formulation (vinyl ether, VANAX and ferric actylacetonate [FeAcAc]), the number of the EXAMPLE in which the polymerizable formulation used is described, the ratio of the latter to the activating formulation, and the tensile strength (measured in kg/cm$^2$):

TABLE SIX

| Vinyl Ether | % VANAX | % FeAcAc | EXAMPLE | Ratio | Strength |
|---|---|---|---|---|---|
| PEPC | 1 | 0.1 | ONE | 1:1 | 4 |
| PEPC | 1 | 0.1 | ONE | 9:1 | 190 |
| PEPC | 2 | | TWO | 1:1 | 35 |
| PEPC | 2 | | TWO | 9:1 | 267 |
| CHVE | 0.5 | 0.05 | ONE | 1:1 | * |
| CHVE | 1 | 0.1 | ONE | 9:1 | 281 |
| CHVE | 2 | | TWO | 1:1 | 84 |
| CHVE | 2 | | TWO | 9:1 | 260 |
| DVE-3 | 1 | 0.1 | ONE | 1:1 | 42 |
| DVE-3 | 1 | 0.1 | ONE | 9:1 | 176 |
| DVE-3 | 2 | 2 | TWO | 1:1 | 84 |
| DVE-3 | 2 | 2 | TWO | 9:1 | 162 |

* rate of cure too fast to be practical

Fundamental to the present invention, therefore, is the use of a liquid vinyl ether, alone or in combination with a liquid epoxide, as a diluent for the free radical-initiating component of a catalyst system. As will be appreciated by those skilled in the art, the initiating component reacts with an active oxygen catalyst provided to produce free radicals, which in turn effect polymerization of acrylate ingredient(s) of the polymerizable formulation.

As a primary and necessary attribute of the diluents employed, they copolymerize substantially with the ingredients of the polymerizable formulation. Another important feature is that they remain stable for extended periods of time in combination with the activator component. In addition, however, the instant diluents impart excellent characteristics to the compositions provided, including good reducibility, low volatility, high dissolving power, low toxicity and skin irritation, and high curing activity, and they may also serve to promote penetration into surfaces of the part(s) that are to be bonded or coated. The vinyl ethers and epoxides used have moreover been well characterized and are presently produced commercially, and they are generally regarded as safe, non-toxic materials.

The class of vinyl ether diluents found to be effective in the practice of the present invention are broadly defined by the structural formula hereinabove set forth, and preferred compounds have also been specifically identified. Suitable epoxides may have a linear or cyclic structure, and compounds containing multiple epoxy groups may be employed; again, specific epoxides have been identified, and others will be evident to those skilled in the art from the description provided.

It is a most surprising feature of the present invention that the vinyl ethers and epoxides function as diluents for the activators while not reacting spontaneously therewith, and that they thereby afford extended shelf-life in the admixture. It is a further surprising feature of the invention that the epoxides copolymerize in the present compositions, when subjected solely to low-temperature, free radical curing conditions, since they are generally regarded to cure by additive or cationic mechanisms and are normally subject to free radical-induced curing only under forcing conditions; similarly, vinyl ethers normally polymerize at ambient temperatures through cationic mechanisms.

In addition to the other advantages herein described, dilution of the initiating ingredient can serve to provide an activating formulation that can be utilized in a direct weight or volume proportion to the polymerizable formulation, and it enables further modification to provide controlled viscosities, and ultimately an activation formulation gel. These capabilities afford self-evident benefits in manufacturing and production operations; e.g., they enable facile metering and ready combination of the components of the composition in a static mixer; they permit application as stable, side-by-side beads; etc. As indicated by EXAMPLE TEN, however, the formulations may be employed in a wide range of relative proportions, as may be most advantageous.

Monomers that are suitable for use in the adhesive formulations of the instant compositions include of course both monofunctional and polyfunctional acrylates and methacrylates. They will generally be reaction products of acrylic acid and/or methacrylic acid with one or more mono- or polybasic, substituted or unsubstituted, alkyl ($C_1$ to $C_{18}$), aryl or aralkyl alcohols. Acrylates in which the alcohol moiety contains a polar substituent (e.g., an hydroxyl, amine, halogen, cyano, heterocyclic or cyclohexyl group) will often be preferred because crosslinking, or other intermolecular bonding, is promoted thereby. Suitable such monomers and prepolymers are well known in the art, and are in part disclosed for example at line 53, column 6, through line 35, column 7 of the above-mentioned Bachmann et al U.S. Pat. No. 4,429,088, and at line 14, column 4 through line 52, column 5 of U.S. Pat. No. 4,451,523. Nevertheless, it might be noted that the following acrylates and corresponding methacrylates (the methacrylate compounds being preferred in many instances) are especially suitable for use in the present compositions, alone or in combination with one another: hydroxyethylacrylate, isobornyl acrylate, tetrahydrofurfuryl acrylate, dietheleneglycol diacrylate, butylene glycol diacrylate, neopentyl glycol diacrylate, octylacrylate and decylacrylate (normally in admixture), polyethyleneglycol diacrylate, trimethylcyclohexyl acrylate, benzyl acrylate, butyleneglycol diacrylate, polybutyleneglycol diacrylate, tripropyleneglycol diacrylate, trimethylolpropane triacrylate, di-trimethylpropane tetraacrylate, and di-pentaerythritol pentaacrylate.

If an elastomeric domain-providing filler is to be incorporated, virtually any solid material that is soluble (to at least a significant degree) in a monomer fraction, and that serves to toughen, flexibilize and/or strengthen the cured material, may be used. The filler need not however be introduced as a rubbery solid; liquids and waxy substances are also entirely suitable. It is most desirable that the filler be reactive with the monomeric components to produce intermolecular bonding, since that will enhance compatibility and tend to maximize the ultimate properties of the adhesive or deposit produced. In any event, it is believed that the effective fillers toughen or otherwise desirably modify the cured polymer by dispersing in the monomer formulation to provide elastomeric domains; generally, they will be rubbery or elastomeric materials, thermoplastic polymers, or macromers.

Although the selection of specific appropriate elastomeric domain-providing fillers will also be evident to those skilled in the art, it might be mentioned that typical suitable materials include vinyl polymers, acrylic polymers, polyester elastomers, glycol polymers, acrylated epoxies, natural and synthetic rubbers, polyester acrylates, epoxy acrylates, polyether acrylates, alkyd acrylates, polyol acrylates, and the like. In many instances, use of the urethane polymers and prepolymers will be found most beneficial, with the latter being especially desirable due to the potential that they afford for further reaction of their pendant isocyanate groups with a reactive functionality (e.g., an hydroxyl group) provided by a suitable acrylate monomer; diisocyanate-capped polyethers acrylated by reaction with hydroxyethyl acrylate or hydroxyethyl methacrylate and having a molecular weight of about 400 to 6,000, are particularly preferred.

It should perhaps be emphasized that many compositions will require no prepolymer or other filler. When such an ingredient is employed, however, it will generally constitute at least about 5 to as much as 60 weight percent of the composition, and preferably about 20 to 50 weight percent thereof.

The active oxygen compound may be a conventional peroxide catalyst (e.g., dicumyl peroxide), hydroperoxide catalyst (e.g., cumene hydroperoxide) or perester catalyst (e.g., tertiary-butyl perbenzoate and tertiary-butyl peroctoate). To increase the rate of cure the composition will advantageously include about 0.5 to 5 percent by weight of an organic acid (usually maleic) which is capable of cyclic tautomerism (as more fully described in the aforesaid Bachmann patents), and about 2 to 6 weight percent of acrylic acid (which will generally increase adhesion, as well).

As will be appreciated by those skilled in the art, the metal accelerator that is desirably employed may be introduced in the form of virtually any compatible and adequately soluble organic or inorganic compound; normally, it will be introduced from the activator formulation. For example, the ferric ion may be provided as ferric sulfate, ferric chloride, ferric octoate, or ferrocene; more soluble compounds such as ferric acetylacetonate are however preferred. Corresponding cupric and ferrous salts may be used when those ions are to be present, and other exemplary compounds include cobaltous naphthenate, cerium naphthenate, cupric naphthenate, manganese naphthenate, cobaltic acetylacetonate hydrate, vanadium acetylacetonate, and lead linoleate. It will also be appreciated that solubilizing agents for the metal compounds may be employed in appropriate circumstances.

The concentration in which the metal ion is used may vary widely, and will depend to an extent upon the other ingredients of the system and the results desired; however, it will usually range from a trace to perhaps one hundred parts per thousand. It has been shown that increasing the amount of metal accelerator can produce a correspondingly pronounced affect upon the rate of cure, albeit that relatively high concentrations may produce excessive coloration. Indeed, there appears to be a synergistic effect produced by metal ions (especially iron) in combination with an amine-aldehyde activator and a vinyl ether diluent, in that superior bond strength is produced as compared to a comparable system in which the diluent is an inert organic solvent.

Any of the amine-aldehyde condensation products that are known in the art for curing acrylate monomers may be employed in the activating formulation. However, when the active oxygen compound is a perester particularly desirable results are attained if the amine moiety of the condensation product is aromatic, and most especially when it is aniline, albeit that other aromatic amines such as ethylaniline and o-toluidine may be employed to comparable advantage. When, on the other hand, the active oxygen compound is an hydroperoxide the aliphatic amine-derived condensation products will often be more effective. While a variety of different aldehydes may be used in the condensation reaction, n-butyraldehyde is perhaps the most common, and produces an especially effective product when condensed with aniline.

Notwithstanding the foregoing discussion, it should be understood that any compound or system that is capable of reaction with an active oxygen compound, to generate free radicals, may be employed herein as the chemical initiator, or activator. In this regard, reference may be had to EXAMPLE ELEVEN, and specific mention might be made of the cobalt/aromatic amine, tetramethyl thiourea, and mercaptobenzothiazine systems; many alternatives are found moreover in the anaerobic adhesives art.

As will be appreciated by those skilled in the art, the concentration of amine-aldehyde condensation product, or other chemical initiator employed, will depend upon a number of factors, including the composition of the initiator, the ratio in which the activating and polymerizable formulations are used, and the intended function of the product. Whereas, for example, high-speed curing is usually desirable in an adhesive system consisting of two or more parts, the same property may render the system impractical as a potting compound, due to an inadequate working life. Such factors must moreover be balanced against tensile strength requirements, which will vary depending upon the application in which the composition is to be used. Taking into account all factors, the activating formulation will usually contain 0.5 to 80 weight percent of the free radical-initiating ingredient, with 70 percent being a more typical upper limit; 2 to 5 percent of the ingredient in the activating formulation will generally provide a balance of cure speed and tensile strength that is optimal for adhesive systems, whereas 2 percent or less will generally be optimal for potting compounds.

As noted above, it will often be highly desirable to include a photoinitiator in the composition of the invention, normally as an ingredient of the adhesive formulation; indeed, it will be self-evident that a photoinitiator will be prerequisite to certain applications. For example, photoinitiated compositions are desirably used for the production of conformal coatings, with the chemical mechanism affording shadow curing, and as potting compounds over which a skin may be produced by irradiation, etc.

Although suitable photoinitiators are well known in the art, specific illustrative compounds that might be identified are dimethoxy-2-phenylacetophenone (Ciba-Geigy IRGACURE 651), 1-hydroxycyclohexylphenyl ketone (Ciba-Geigy IRGACURE 184), and 2-hydroxy-2-methyl-1-phenylpropane-1-one (Ciba-Geigy DARO-CUR 1173). A further listing may be obtained by reference to U.S. Pat. No. 4,820,744, particularly at line 43, column 4 through line 7, column 7. When used, the photoinitiator will normally be included in a concentration of 1 to 8 percent, and preferably no more than 4 percent, based upon the weight of the polymerizable formulation.

In addition to the components hereinabove described, other materials may be incorporated into the instant compositions. For example, "inert" fillers such as wood flour, cornstarch, glass fibers, cotton linters, mica, alumina, silica, and the like, may be used to modify viscosity, improve impact resistance, and for other purposes, and it is conventional to include small percentages of silane coupling agents to increase moisture resistance as well as to enhance bond strength to glass and similar surfaces. Other substances such as dyes, flame retarders, stabilizers (e.g., the quinones and hydroquinones), viscosity modifiers (thixotropes, thickeners, viscosity reducers), plasticizers, antioxidants, and the like, may additionally be incorporated.

Notwithstanding the foregoing, it should be emphasized that the provision of a thickened, vinyl ether-diluted activation formulation, and especially one containing an amine-aldehyde condensation product and an amorphous silica of the kind hereinbefore identified, is regarded to be unique to the present invention. It has in the past been found that the amine-aldehyde activators tend to break silica bonds, and thereby reduce the effectiveness of the material; that phenomenon has not however been observed when the activating formulation diluent is a vinyl ether, used in accordance herewith. Other viscosity modifiers that can be employed to particular advantage include cellulose derivatives (e.g., ethyl cellulose and cellulose acetate butyrate), polymethyl methacrylate, polyvinyl pyrrolidone, etc. Typically, the additive will be used in a concentration of about 1 to 20 percent based upon the total weight of activating formulation, depending of course upon the viscosity desired and the nature of the additive.

Although the EXAMPLES provided herein utilize metal parts to demonstrate adhesive bonding and coating, it will be understood that the compositions of the invention are effective for use with other materials, notably wood, glass and plastic. Indeed, as mentioned above, the diluent of which the activating formulation is comprised appears to promote surface penetration and to provide better cleaning, thereby improving adhesion to plastics, contaminated surfaces, and the like. The reactive diluents also appear to protect against oxidation in the activator formulations, and thereby to retard discoloration (e.g., due to the presence of ferric ion) on aging. Perhaps more significantly, however (and as is demonstrated by EXAMPLE FIVE), the evident inhibition to oxidation that is afforded permits extended ambient exposure following application of the activating formulation, thereby enabling enhanced flexibility in the timing of the steps that are carried out, for example, in a manufacturing operation. Finally, it is unexpectedly found that the instant activating formulations not only promote stronger bonds and better adhesion to substrates, but that they also produce surprising increases in curing rates, as compared to the same activators used either without dilution or as dissolved in conventionally employed inert solvents.

Thus, it can be seen that the present invention provides a novel multi-part, solvent-free composition that cures, by free radical-inducing chemical activation, to an adhesive solid, and novel activating formulations suitable for use therein. The diluent employed in the activating formulation is itself copolymerizable with the ingredient(s) of the polymerizable formulation, and it may comprise a mixture of ingredients that function effectively while also affording improved economics. The invention additionally provides methods for bonding, coating, potting and sealing, in which problems and disadvantages stemming from the presence of inert solvents are ameliorated, or entirely avoided.

Having thus described the invention, what is claimed is:

1. A multi-part, solvent-free composition that cures by chemical activation to an adhesive solid, comprising:
   a polymerizable formulation including at least one polymerizable liquid acrylate ingredient; and
   an activating formulation including about 0.5 to 80 percent by weight of a free radical-initiating ingredient that is capable of generating free radicals when reacted with an active oxygen compound and, conversely, about 20 to 99.5 percent of a reactive diluent, 20 to 100 weight percent of said diluent being a liquid vinyl ether compound and any remaining percentage thereof being a liquid epoxy compound, said composition further including an active oxygen compound that is reactive with said initiating ingredient to generate free radicals.

2. The composition of claim 1 wherein said composition consists of two parts, one part being constituted of one of said formulations and the other part being constituted of the other of said formulations, and wherein said polymerizable formulation contains said active oxygen compound.

3. The composition of claim 2 wherein said parts are formulated to react with one another in a 1:1 ratio.

4. The composition of claim 2 wherein said active oxygen compound is selected from the group consisting of peroxide, hydroperoxide and perester catalysts.

5. The composition of claim 1 wherein said initiating ingredient comprises an amine-aldehyde condensation product.

6. The composition of claim 5 wherein said composition further includes a metal accelerator.

7. The composition of claim 1 wherein said vinyl ether diluent is a compound having the structural formula:

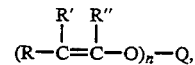

in which formula each of the substituents R, R' and R" independently represents an hydrogen atom, an aliphatic group, or an aromatic group; n is an integer from 1 to 6; and Q represents an aliphatic group, an aromatic group, an alkoxy group, a cycloaliphatic group, an ester group, a polyester group, an ether group, a polyether group, a carbamide group, a carbamate group, or an heterocyclic group, each of said groups optionally being further substituted by an hydroxyl or a vinyl group, or both.

8. The composition of claim 1 wherein said polymerizable formulation comprises at least one polymerizable acrylate monomer, (meth)acrylic acid, at least one elastomeric domain-providing filler, and about 0.5 to 5 percent, by weight thereof, of an organic acid that is capable of cyclic tautomerism.

9. The composition of claim 1 wherein said composition further includes a photoinitiator in an amount effective to effect polymerization of said polymerizable formulation, when subjected to actinic radiation of appropriate wavelength.

10. A multi-part, solvent-free composition that cures by chemical activation to an adhesive solid, comprising:
   a polymerizable formulation including at least one polymerizable liquid acrylate monomer, and an active oxygen compound; and
   an activating formulation including 2 to 80 percent by weight of an amine-aldehyde condensation product providing a free radical-initiating ingredient and, conversely, 20 to 98 percent of a reactive diluent, 20 to 100 weight percent of said diluent being a liquid vinyl ether compound and any remaining percentage thereof being a liquid epoxy compound, said active oxygen compound and said initiating ingredient being interactive to generate free radicals.

11. The composition of claim 10 wherein said vinyl ether diluent is a compound having the structural formula:

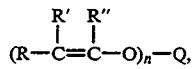

in which formula each of the substituents R, R' and R" independently represents an hydrogen atom, an aliphatic group, or an aromatic group; n is an integer from 1 to 6; and Q represents an aliphatic group, an aromatic group, an alkoxy group, a cycloaliphatic group, an ester group, a polyester group, an ether group, a polyether group, a carbamide group, a carbamate group, or an heterocyclic group, each of said groups optionally being further substituted by an hydroxyl or a vinyl group, or both.

12. The composition of claim 10 wherein said activating formulation further includes a metal accelerator.

13. A multi-part, solvent-free composition that cures to an adhesive solid by chemical activation and by photoinitiation, comprising:
   a polymerizable formulation including at least one polymerizable liquid acrylate monomer;
   an activating formulation including about 0.5 to 80 percent by weight of a free radical-initiating ingredient that is capable of generating free radicals when reacted with an active oxygen compound and, conversely, about 20 to 99.5 percent of a reactive diluent, 20 to 100 weight percent of said diluent being a liquid vinyl ether compound and any remaining percentage thereof being a liquid epoxy compound;
   an active oxygen compound that is reactive with said initiating ingredient to generate free radicals; and
   a photoinitiator for effecting polymerization of said polymerizable formulation when said composition is subjected to actinic radiation of appropriate wavelength.

14. An activating formulation consisting essentially of about 0.5 to 80 percent by weight of a free radical-initiating ingredient that is capable of generating free radicals when reacted with an active oxygen compound and, conversely, about 20 to 99.5 percent of a reactive diluent, 20 to 100 weight percent of said diluent being a liquid vinyl either compound and any remaining percentage thereof being a liquid epoxy compound.

15. The formulation of claim 14 wherein said initiating ingredient comprises an amine-aldehyde condensation product.

16. The formulation of claim 15 wherein said formulation further includes a metal accelerator.

17. The formulation of claim 14 wherein said formulation further includes about 1 to 20 weight percent of a viscosity modifier that is effective to thicken said formulation.

* * * * *